(12) United States Patent
Bigolin

(10) Patent No.: US 7,264,308 B2
(45) Date of Patent: Sep. 4, 2007

(54) QUICK-CONNECT STRUCTURE FOR BICYCLE SADDLE

(75) Inventor: Barbara Bigolin, Asolo (IT)

(73) Assignee: Selle Royal, Pozzoleone (Vicenza) (IT)

( * ) Notice: Subject to any disclaimer, the term of this patent is extended or adjusted under 35 U.S.C. 154(b) by 0 days.

(21) Appl. No.: 11/194,082

(22) Filed: Jul. 28, 2005

(65) Prior Publication Data

US 2006/0061156 A1    Mar. 23, 2006

(30) Foreign Application Priority Data

Sep. 17, 2004   (IT)   ............................ VI2004A0217

(51) Int. Cl.
    *A47C 7/62*   (2006.01)
(52) U.S. Cl. ................................. 297/188.12
(58) Field of Classification Search ............. 297/463.1, 297/188.12, 195.1, 188.08, 215.16, 195.11; 224/430
See application file for complete search history.

(56) References Cited

U.S. PATENT DOCUMENTS

| | | | |
|---|---|---|---|
| 4,566,617 A | 1/1986 | Jackson | |
| 4,662,677 A * | 5/1987 | Hughes | .................... 297/195.1 |
| 5,190,345 A | 3/1993 | Lin | |
| 5,593,126 A | 1/1997 | Muderlak | |
| 5,655,694 A | 8/1997 | Keckeisen | |
| 5,893,501 A | 4/1999 | Schwimmer | |
| 2004/0149792 A1 | 8/2004 | Akita et al. | |

FOREIGN PATENT DOCUMENTS

| | | | |
|---|---|---|---|
| DE | 3206314 | * | 9/1983 |
| EP | 1 413 504 A1 | | 4/2004 |
| WO | WO94/25331 | * | 11/1994 |
| WO | WO-02/038436 A2 | | 5/2002 |
| WO | WO-03/013946 A1 | | 2/2003 |
| WO | WO-03/024770 A1 | | 3/2003 |

* cited by examiner

*Primary Examiner*—Milton Nelson, Jr.
(74) *Attorney, Agent, or Firm*—Alston & Bird LLP

(57) ABSTRACT

The invention is directed to a quick-connect structure for a bicycle saddle, particularly for removably mounting an accessory, such as a tool kit or the like, to the saddle. The saddle has at least one load-bearing body to be attached to a bicycle frame. The quick-connect structure comprises at least one male member that may be snap-fitted in a corresponding female member. The male member and the female member are associated either to the saddle or to the accessory. Preferably, one of the male member and the female member is integrally and monolithically formed in the body of the saddle.

18 Claims, 4 Drawing Sheets

QUICK-CONNECT STRUCTURE FOR BICYCLE SADDLE

FIELD OF THE INVENTION

The present invention finds application in the field of sport and leisure accessories, and particularly relates to a quick-connect structure for bicycle saddles. The invention further relates to various components of a quick-connect structure.

BACKGROUND

One of the drawbacks associated with two-wheeled vehicles, particularly bicycles and motorcycles, is known to be the limited luggage-carrying capacity of such means of transport. Especially in bicycles, a problem may also arise from the need of carrying emergency equipment and accessories to be used in case of mechanical breakdowns, including screw drivers or wrenches. Special containers or tool kits have been designed to this purpose.

A number of technical arrangements have been developed to solve the problem of carrying such containers. EP 1413504 discloses a bicycle saddle having a hollow compartment at its front end for storage of equipment. This arrangement is rather uncomfortable and bulky and requires a rather large saddle.

PCT Published Patent Application WO 03/013946 discloses an apparatus that allows for attachment of a tool kit to a bicycle seat post. This arrangement is also bulky and impractical and has the disadvantage of at least partly preventing seat post adjustment, thereby limiting the function of this component.

U.S. Pat. No. 5,593,126 discloses a system for attaching accessories to the saddle using a clip to be connected to the saddle rail. This arrangement also has drawbacks in that, in addition to limiting rail adjustment, it uses a connector member between the saddle and the accessory to be connected, which may loosen or fail with time. Other arrangements more or less associated to the above are disclosed in the following publications: U.S. Pat. No. 5,655,694; WO 03/024770; U.S. Patent Publication No. 2004/149792; U.S. Pat. No. 5,893,501; and U.S. Pat. No. 4,566,617.

PCT Published Patent Application WO 02/038436 discloses a connector system located behind a bicycle saddle, which connector system comprises a support designed to house a tool kit and is directly connected to the saddle. In addition to the same problem of bulkiness as the above models, such arrangement has the disadvantage of causing undesired noisy vibrations of the objects being carried, especially when they are made of metal. Also, the connector device alone is attached to the rear of the saddle by appropriate attachment means, which may loosen and cause an accidental loss of accessories.

SUMMARY OF THE INVENTION

The object of this invention is to overcome the above drawbacks by providing a quick-connect structure for a bicycle saddle which achieves high efficiency and has a relatively simple construction. A particular object is to provide a structure that allows an easy and safe connection of accessories to the bicycle saddle.

Another object of the invention is to provide a structure that does not limit the adjustment of the saddle's sliding parts, such as the seat post or the rails.

A further object of the invention is to provide a structure having minimum space requirements.

These objects, as well as other objects that will be apparent hereafter, are achieved by providing a quick-connect structure for a bicycle saddle. In one embodiment, the saddle has at least one load-bearing body for attachment to a bicycle frame, and the quick-connect structure comprises at least one male member that may be snap-fitted in a corresponding female member. The male and female members are separately associated to one of the saddle and an object for attachment to the saddle. The quick-connect structure is preferably formed such that at least one of the male and female members is integrally and monolithically formed in the body of the saddle.

The structure of the invention beneficially allows an easy and safe connection of accessories to the bicycle saddle.

According to a further aspect of the invention, there is provided a male member of a quick-connect structure for a bicycle saddle. In one embodiment, the male member is designed to be rigidly attached to an object, such as a tool kit or the like.

According to yet another aspect of the invention there is provided a female member of a quick connect structure for a bicycle saddle. In one embodiment, the female member is designed to be an integral part of the saddle body.

BRIEF DESCRIPTION OF THE DRAWINGS

Further characteristics and advantages of the invention will be more apparent from the detailed description of a few preferred, non-exclusive embodiments of a quick-connect structure according to the invention, which is described as a non-limiting example with the help of the annexed drawings, in which.

DETAILED DESCRIPTION OF THE INVENTION

Figure 1:
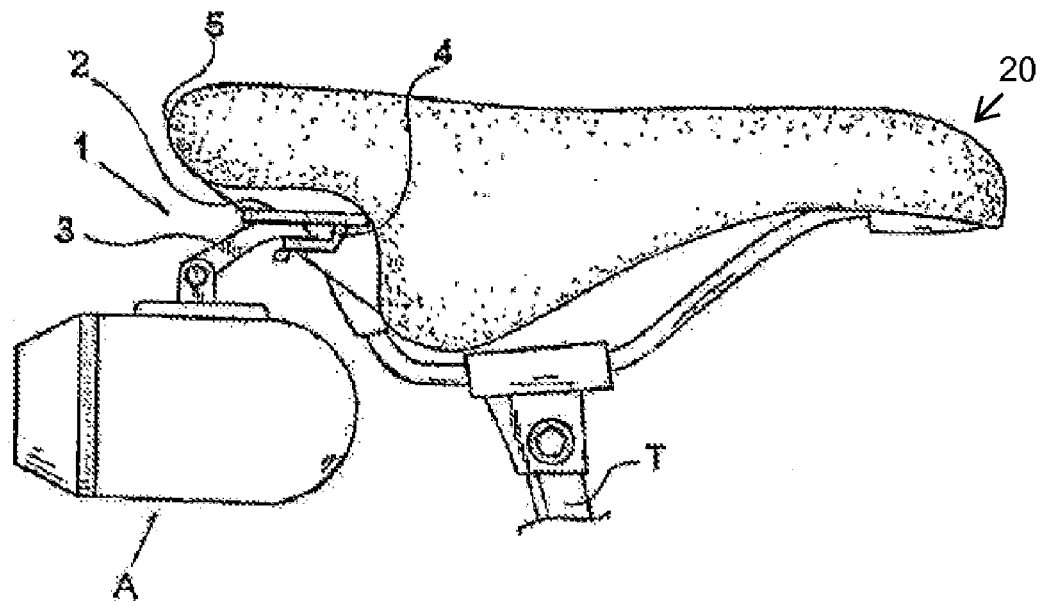
FIG. 1 is a partly sectional side view of a bicycle saddle comprising one embodiment of the quick-connect structure according to the invention.
Figure 2:
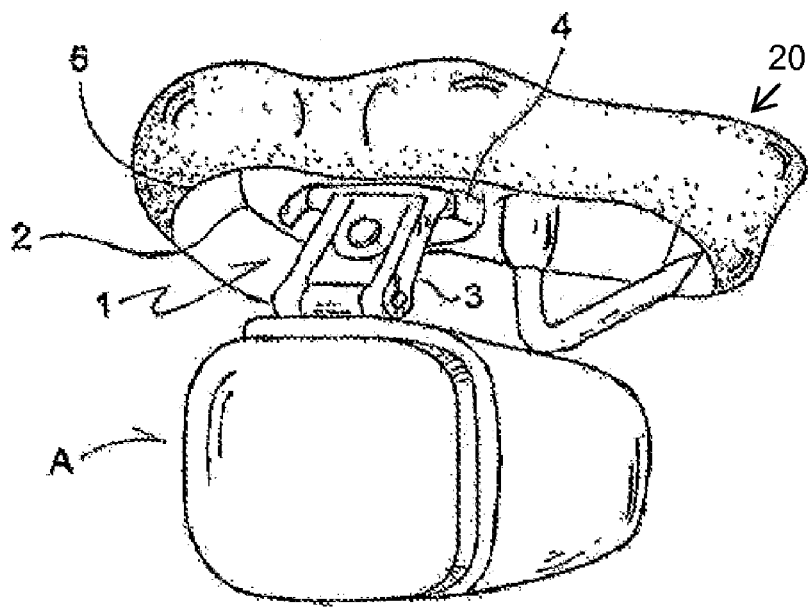
FIG. 2 is a rear perspective view of a bicycle saddle comprising one embodiment of the quick-connect structure according to the invention.

With particular reference to the figures, a quick-connect structure 1 according to the invention is particularly suitable for removably coupling an accessory A, such as a tool kit, a mudguard, a reflector, a water bottle cage, or the like, to a saddle 20. It is understood that the foregoing examples are non-limiting, and the invention further encompasses the removable coupling of other items readily recognizable as possibly useful to the user of a saddle to which the particular item could be coupled. The saddle 20 has at least one load-bearing body 2 to be attached to a bicycle frame T, which is made, for instance, by injection molding of a plastic material.

The quick-connect structure 1 comprises at least one male member 3, which can be formed so as to be snap-fitted in a corresponding female member 4. The quick-connect structure 1 is particularly formed such that the male member 3 and female member 4 may each be associated to either the saddle 20 or the accessory A. Accordingly, in one embodiment of the invention, the male member 3 is associated with the saddle 20, and the female member 4 is associated with the accessory A. In another embodiment, the male member 3 is associated with the accessory A, and the female member 4 is associated with the saddle 20.

In one particular embodiment of the invention, at least one of the male member 3 and the female member 4 is integrally and monolithically formed in the body 2 of the saddle 20. Advantageously, when one of the male member 3 and the female member 4 is so formed in the body 2 of the saddle 20, the other member can be formed so as to be attachable to the accessory A. Preferably, such attachment is a rigid attachment. Accessories of any type may thus be easily and safely connected to the saddle with no connection members therebetween which may be easily broken or damaged.

Figure 6:
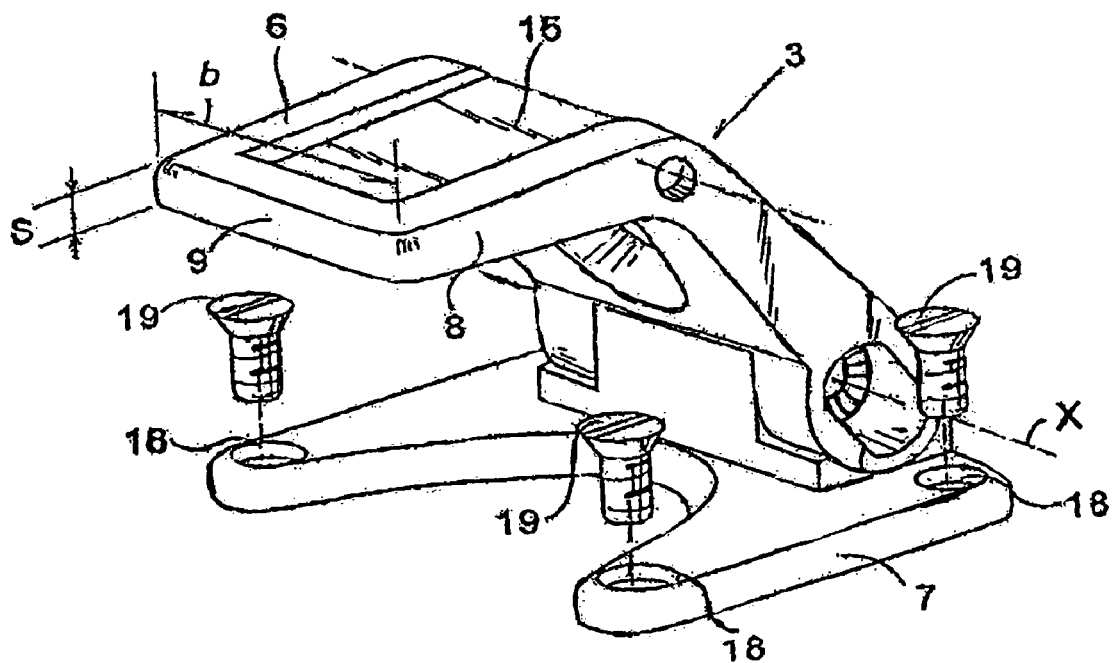
FIG. 6 is an axonometric view of the quick-connect structure of the invention according to one embodiment of the invention.
Figure 7:
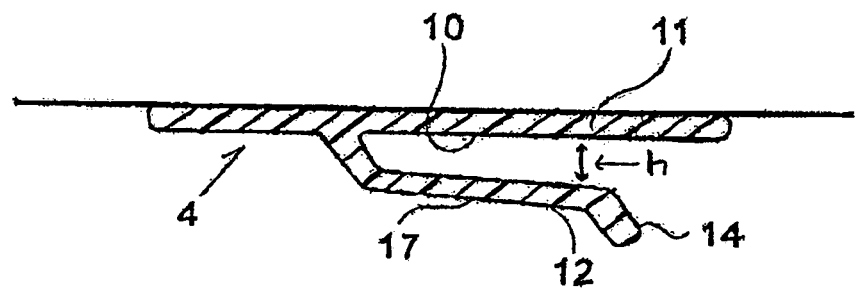
FIG. 7 is a plan view of a detail of the embodiment of the invention illustrated in FIG. 1.
Figure 8:
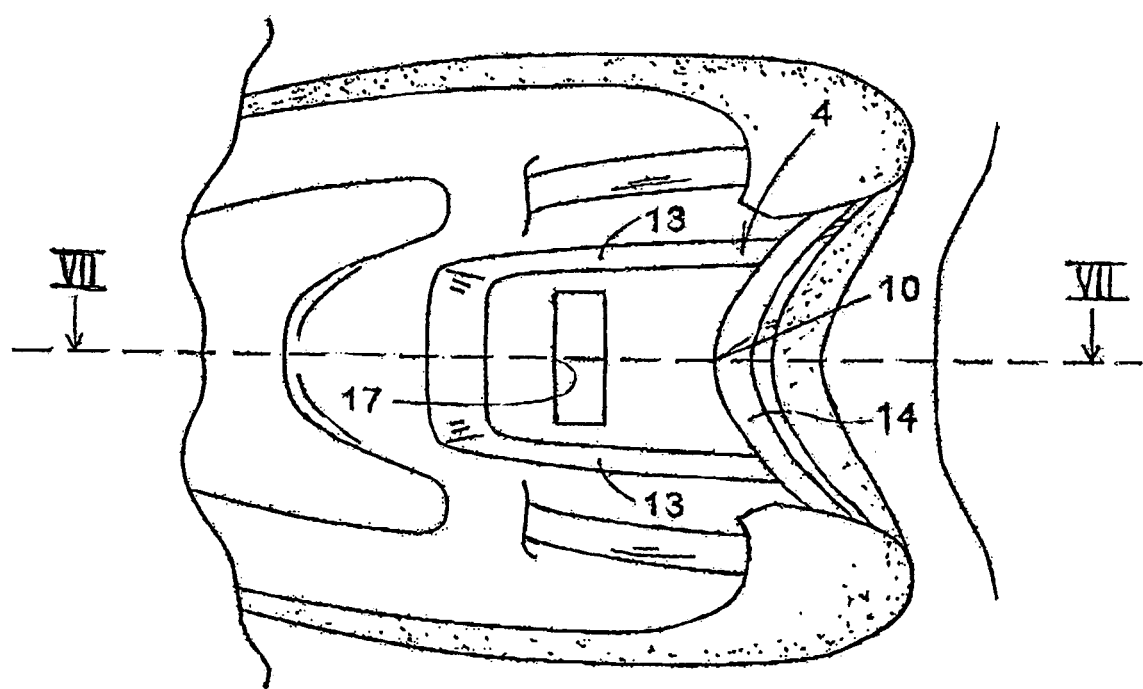
FIG. 8 is a partly sectional side view, taken on a plane VII-VII, of a detail of one embodiment of the invention.

In the particular embodiments of the invention shown in FIGS. 6 and 7, by way of indication and without limitation, the female member 4 is integrally and monolithically formed in the body 2 of the saddle 20 in the proximity of its rear edge 5. By this arrangement, the presence of the quick-connect structure 1 (and accordingly, the item attached thereby) does not limit the adjustment of the saddle's sliding parts, such as the seat post or the saddle rail, as the latter do not interact with any part of the quick-connect structure 1 of the invention.

Figure 3:
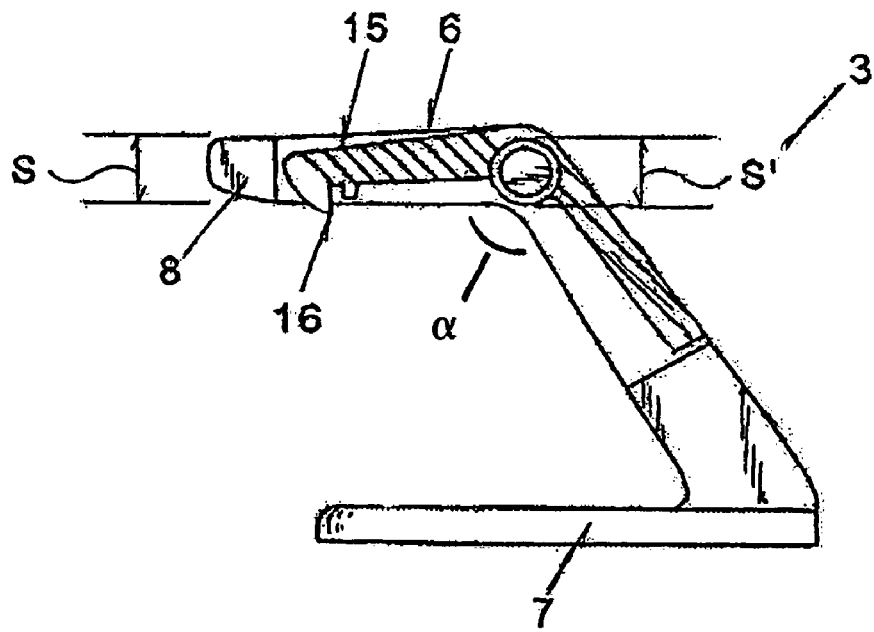
FIG. 3 is a partly sectional side view of a detail of the quick-connect structure according to one embodiment of the invention.

Suitably, the male member 3 can include a first elongated portion 6 useful for removable connection to the female member 4 and a second portion 7 for rigid connection to the accessory A. According to one particular embodiment, the first portion 6 and the second portion 7 can be joined together to form a predetermined angle α, as shown in FIG. 3.

Figure 4:
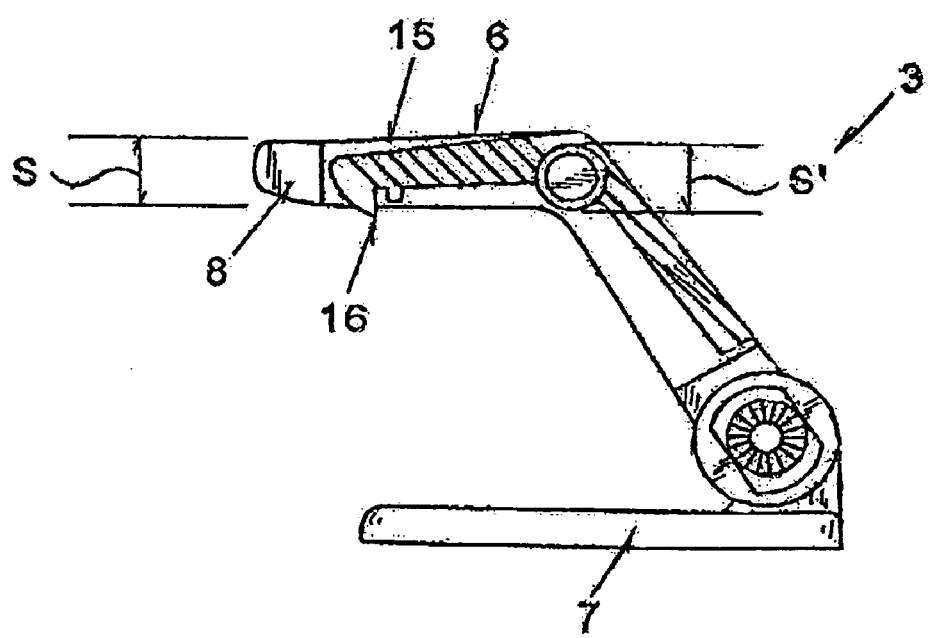
FIG. 4 is a partly section side view of a further detail of the quick-connect structure according to one embodiment of the invention.
Figure 5:
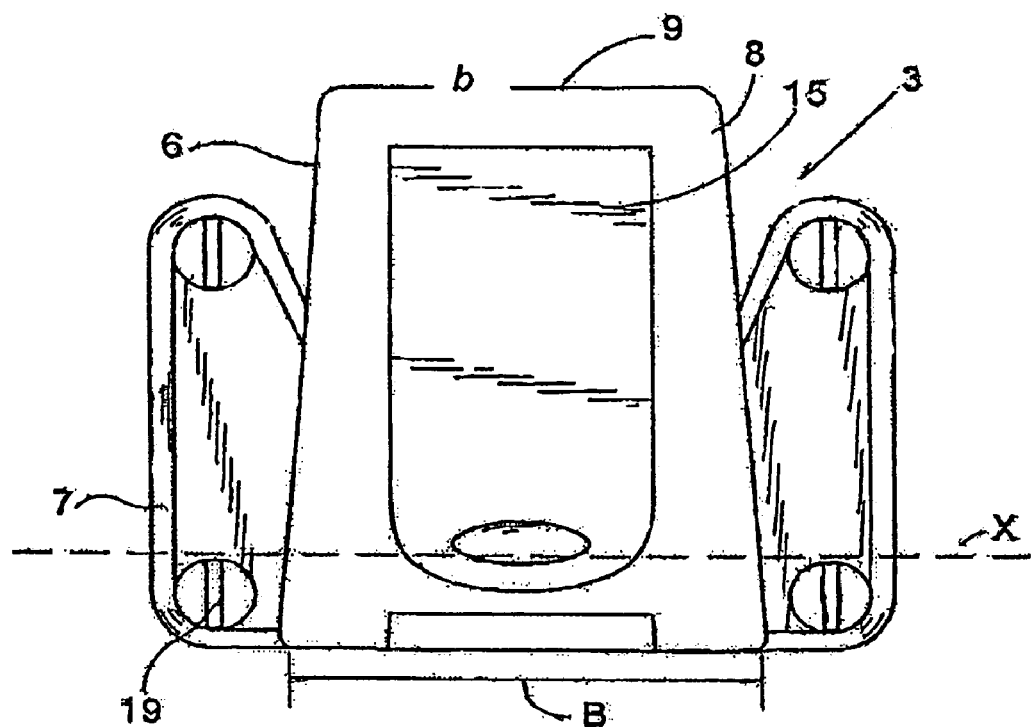
FIG. 5 is a top view of a detail of the quick-connect structure according to one embodiment of the invention.

According to another embodiment of the invention, as illustrated in FIG. 4 through FIG. 6, the first portion 6 and the second portion 7 may be rotatably coupled for mutual relative rotation about a predetermined axis X. Thus, the accessory A may be even more conveniently mounted. The possibility of mutual articulation of the first portion 6 and the second portion 7 allows for placement of the accessory A in the most convenient position to facilitate the connection/release thereof to and from the saddle 20, regardless of its shape and relative adjustments.

In both of the embodiments described above, the first portion 6 may have an elongated appendix 8 having a substantially prismatic shape, tapering toward the free end 9, for insertion in a complementary receptacle 10 that defines the female member 4. Suitably, the appendix 8 can have a substantially trapezoidal plan shape with a major base B and a shorter base b with rounded edges at the free end 9. Further, the appendix 8 can have a decreasing thickness S moving from the major base B to the free end 9. This facilitates the introduction of the appendix 8 in the receptacle 10.

The shape of the receptacle 10 may in turn be complementary to that of the appendix 8, having a shape for receiving the substantially prismatic shaped elongated appendix 8 that is tapered toward the free end 9 thereof. For example, in one embodiment, the complementary shape of the receptacle can be formed of an upper wall 11 and a lower wall 12 joined together by a pair of side walls 13 and 13'. Advantageously, at least one of the upper wall 11 and the lower 12 can have a curved edge 14 to act as a guide surface to introduce the appendix 8 in the receptacle 10.

Suitably, the height h of the receptacle 10 will not be less than the thickness s' of the appendix 8 at its longer base, the major base B. Thus, the introduction of the appendix 8 in the receptacle 10 is fast and effective, even when the user is in a rotated position, as is frequently the case.

The appendix 8 may be prevented from accidentally disengaging from the receptacle 10 by a pulling action by providing the appendix 8 with a suitable snap lock means 15. Preferably, the snap lock means 15 includes a projection or a tooth 16, which is engagable in a corresponding slot 17 in the receptacle 10. For example, the slot 17 can be formed in the lower wall 12 of the female member 4. Such an arrangement facilitates a firm and safe lock between the male member 3 and the female member 4.

Preferably, the snap lock means 15 is biased into a position such that the snap lock means 15 engages the female member 4, such as in the slot 17 described above. Further, the snap lock means 15 is preferably formed such that accidental or unintentional disengagement is avoided but that intentional disengagement by a user is easily facilitated. For example, the snap lock means 15 can be pivotally attached to the appendix 8, such as near the area where the first portion 6 and the second portion 7 are joined together to form the predetermined angle α. Accordingly, the male member 3 can be disengaged from the female member 4 by depressing an end of the snap lock means opposite the projection or tooth 16, thereby pivoting the snap lock means such that the projection or tooth is disengaged from the corresponding slot 17.

Suitably, the second portion 7 can have one or more holes 18 for facilitating attachment of the second portion 7 to the accessory A. Attachment means 19 can include any suitable means, such as screws or rivets, for example, to facilitate fastening of the second portion 7 to the accessory A, thereby assuring a stable and effective coupling thereof.

From the above disclosure, the quick-connect structure of the invention proves to fulfill the proposed objects and particularly meets the requirement of allowing an easy and safe connection of accessories to the bicycle saddle. Particularly arising from the monolithic integration of the female member 4 in the body 2 of the saddle 20, and also to the configuration of the male member 3, an accessory A can be firmly connected to a saddle 20 while minimizing the risks of accidental losses or failures.

In line with the above description of certain embodiments of the quick-connect structure, the invention further provides a method of attaching an accessory to a bicycle. In one embodiment, the method comprises attaching the accessory to one of the male member or the female member of the quick-connect structure. The members can then be snap-locked together, thereby securely attaching the accessory to the bicycle. Preferably, the bicycle includes a saddle with at least one load-bearing body, and the male member or female member not attached to the accessory is integrally and monolithically formed in the body of the saddle.

The structure of the invention is susceptible to a number of changes and variants within the inventive concept discloses herein. All the details thereof may be replaced by other technically equivalent parts, and the materials may vary depending on different needs, without departure form the scope of the invention. While the structure has been described with particular reference to the accompanying figures, the numerals referred in the disclosure are only used for the sake of a better intelligibility of the invention and are not intended to limit the claimed scope in any manner.

The invention claimed is:

1. A quick-connect structure for removably coupling an accessory to a bicycle saddle having a load bearing body, said structure comprising at least one male member formed to engage a corresponding female member that is integrally and monolithically formed in the body of the saddle, a locking mechanism for preventing unintentional disengagement of the male member from the female member, and a disengagement mechanism for facilitating quick disengagement of the locking mechanism by the user, said male member comprising a first portion for removable connection to the female member and a second portion for rigid connection to the accessory, wherein the first portion of the male member includes an elongated appendix having a major base and a free end and having a substantially prismatic shape tapered toward the free end.

2. The quick-connect structure according to claim 1, wherein the appendix has a substantially trapezoidal shape.

3. The quick-connect structure according to claim 1, wherein the appendix has a thickness that decreases moving away from the major base and toward the free end of the appendix.

4. The quick-connect structure according to claim 1, wherein the female member comprises a receptacle for insertion therein of the male member, wherein the receptacle is of a complimentary shape for receiving the substantially prismatic shaped elongated appendix of the male member tapered toward the free end thereof.

5. The quick-connect structure according to claim 4, wherein the receptacle has a height that is at least equal to the thickness of the appendix at the major base thereof.

6. The quick-connect structure according to claim 4, wherein the receptacle of complimentary shape for receiving the elongated appendix of the male member comprises an upper wall and a lower wall joined together by a pair of side walls.

7. The quick-connect structure according to claim 6, wherein at least one of the upper wall and the lower wall has curved edges.

8. The quick-connect structure according to claim 1, wherein the appendix includes said locking mechanism.

9. The quick-connect structure according to claim 8, wherein the locking mechanism includes a projection that is engagable in a corresponding slot in the receptacle.

10. A quick-connect structure removably coupling an accessory to a bicycle saddle, said structure comprising:
a female member; and
at least one corresponding male member having a first portion formed to be removably snap-fittable in the female member and a second portion for rigid connection to the accessory, said first portion including an elongated appendix having a major base and a free end, said appendix having a substantially prismatic shape tapered toward the free end;
wherein the saddle has at least one load bearing body, and wherein one of the male member and the female member is integrally and monolithically formed in the body of the saddle.

11. The quick-connect structure according to claim 10, wherein the appendix has a substantially trapezoidal shape.

12. The quick-connect structure according to claim 10, wherein the appendix has a thickness that decreases moving away from the major base and toward the free end of the appendix.

13. The quick-connect structure according to claim 10, wherein the female member comprises a receptacle for insertion therein of the male member, wherein the receptacle is of a complimentary shape for receiving the substantially prismatic shaped elongated appendix of the male member tapered toward the free end thereof.

14. The quick-connect structure according to claim 13, wherein the receptacle has a height that is at least equal to the thickness of the appendix at the major base thereof.

15. The quick-connect structure according to claim 13, wherein the receptacle of complimentary shape for receiving the elongated appendix of the male member comprises an upper wall and a lower wall joined together by a pair of side walls.

16. The quick-connect structure according to claim 15, wherein at least one of the upper wall and the lower wall has curved edges.

17. The quick-connect structure according to claim 10, wherein the appendix includes snap-locking means capable of preventing accidental disengagement thereof from the female member.

18. The quick-connect structure according to claim 17, wherein the snap-locking means include a projection that is engagable in a corresponding slot in the receptacle.

* * * * *